Aug. 23, 1927.
J. F. O'CONNOR
1,640,210
FRICTION SHOCK ABSORBING MECHANISM
Filed July 21, 1924 2 Sheets-Sheet 1
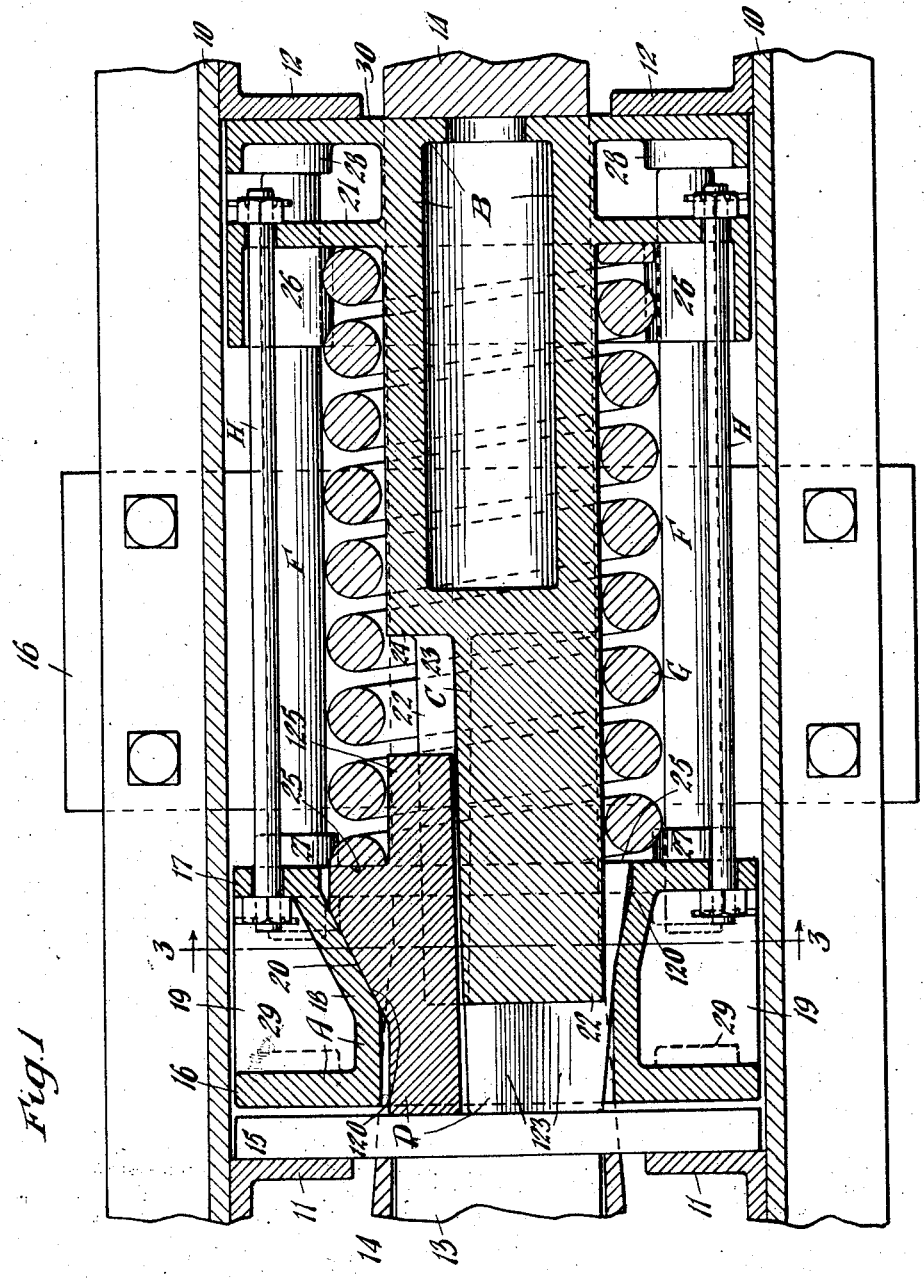
Witnesses
Wm. Geiger
Inventor
John F. O'Connor
By George J. Haight
His Atty.

Aug. 23, 1927.
J. F. O'CONNOR
1,640,210
FRICTION SHOCK ABSORBING MECHANISM
Filed July 21, 1924
2 Sheets-Sheet 2
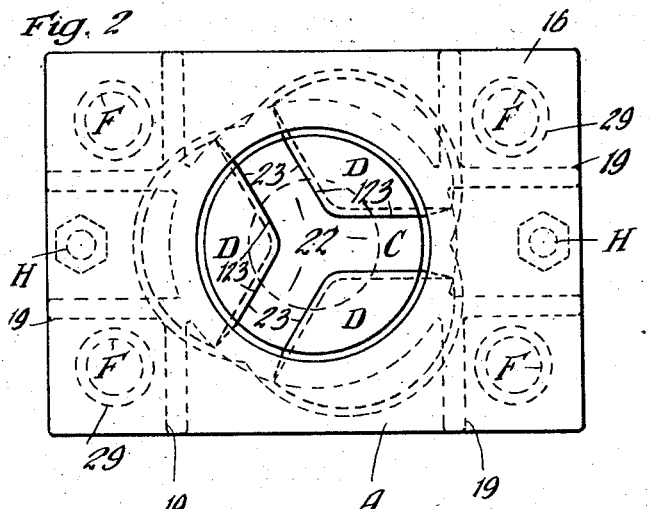
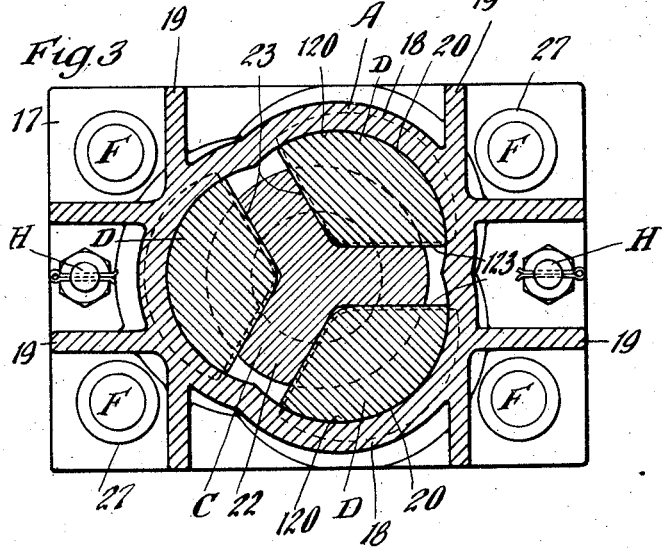
Witnesses
Wm. Geiger
Inventor
John F. O'Connor
By George I. Haight
His Att'y Patented Aug. 23, 1927.

1,640,210

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 21, 1924. Serial No. 727,110.

This invention relates to improvements in friction shock absorbing mechanisms.

One object of the invention is to provide a friction shock absorbing mechanism especially adapted for railway draft riggings wherein are obtained light resistance during initial or preliminary action and an automatic change to a high final frictional resistance during the compression stroke, the light initial shocks during the preliminary action being absorbed mainly by a spring resistance element and the heavier shocks, during the remainder of the stroke, being absorbed by the combined action of said spring resistance and friction elements.

Another object of the invention is to provide, in a mechanism of the character indicated, a spring resisted wedge system including friction wedge shoes coacting with a central friction member having exterior friction surfaces, wherein the wedge system is so arranged that during the initial action and for a predetermined portion of the compression stroke, the friction shoes are directly actuated from the usual main follower of the gear independently of any wedging action, the wedge means subsequently being directly actuated with the result that a wedging action is set up in the wedge system effectively forcing the friction shoes against the friction member during the remainder of the compression stroke.

Other objects and advantages of the invention will more clearly and fully appear from the description and claims hereinafter following.

In the drawings forming a part of this specification, Figure 1 is a longitudinal, horizontal, sectional view of a portion of a railway draft rigging showing my improvements in connection therewith. Figure 2 is a front end, elevational view of the shock absorbing mechanism proper. And Figure 3 is a vertical, transverse, sectional view of the shock absorbing mechanism proper, corresponding substantially to the line 3—3 of Figure 1.

In said drawings, 10—10 indicate channel-shaped center or draft sills of a railway car underframe, to the inner faces of which are secured front stop lugs 11—11 and rear stop lugs 12—12 of usual construction. A portion of the drawbar is indicated at 13, the same having operatively associated therewith a yoke 14 of well-known construction, within which is disposed the shock absorbing mechanism proper and a front follower 15. The yoke and the parts contained therein are supported in operative position by a detachable saddle plate 16.

The improved shock absorbing mechanism proper, as shown, comprises a front wedge casting A; a rear follower casting B having a friction post member C formed integral therewith; three friction wedge shoes D—D; four stop members F; a spring resistance G; and a pair of retainer bolts H.

The front wedge casting A is of hollow construction and comprises front and rear transverse walls 16 and 17 and a shell portion 18 intermediate said walls. The casting A is suitably reinforced by a plurality of webs 19—19 extending from the front to the rear walls thereof. As clearly shown in Figures 1 and 3, the shell portion 18 of the casting A is formed with a plurality of true cylindrical interior wedge faces 20 diverging inwardly of the mechanism, there being preferably three cylindrical faces 20. The front wall 16 of the casting A is normally slightly spaced from the inner surface of the front follower 15 and is adapted to coact therewith during compression of the mechanism.

The rear follower casting B is of generally rectangular outline and has the post C formed integral therewith, as hereinbefore pointed out. The follower B is provided with a rear wall 30 adapted to coact with the stop lugs 12 and a spaced web 21 laterally projecting from the rear end of the post C and extending parallel to said rear wall. The friction post C is provided at the forward end thereof with three equally spaced, radially projecting arms 22, thereby providing three longitudinally disposed V-shaped friction surfaces 23 diverging slightly toward the rear end of the mechanism. As clearly shown in Figure 1, a shoulder 24 is provided at the inner end of each of the friction surfaces 23, for a purpose hereinafter described.

The three friction shoes D, preferably in the form of castings, are of like construction, each having a V-shaped inner friction surface 123 adapted to cooperate with one of the V-shaped friction surfaces 23 of the post C. At the outer end each of the friction shoes is provided with a rearwardly and outwardly inclined cylindrical face 120 cooperating with one of the faces 20 of the front follower C and corresponding in angularity thereto as clearly shown in Figure 1. At the inner end, each wedge shoe is cut away at the outer side thereof to provide a rearward extension 125 and a transverse face 25 adapted to form an abutment for the outer end of the main spring resistance G, the opposite end of said spring bearing on the web 21 of the rear follower member B. As shown in Figure 1, the spring resistance G surrounds the post and the forward end thereof receives the rearwardly projecting portions 125 of the shoes D.

The stop members F are four in number, extend longitudinally of the mechanism and are located at the corners of the follower B, being slidably mounted within bosses 26 formed on the web 21 of the rear follower B and bosses 27 on the wall 17 of the casting A and have their rear ends normally abutting bosses 28 on the wall 30 of the follower B and adapted to coact with abutments 29 on the wall 16 of the casting A. The stop members F are of such a length that the front ends thereof are normally spaced such a distance from the abutments 29 as to limit the relative movement of the casting A with reference to the follower B when the mechanism is fully compressed, the stop members F forming in effect stop columns by which the excess pressure is transmitted directly from the front follower through the casting A to the rear follower and the corresponding stop lugs to prevent the main spring from being driven solid.

The retainer bolts H are two in number and are arranged at opposite sides of the gear, midway of its height. Each bolt has the rear end thereof anchored to the web 21 of the rear follower casting and its front end anchored to the wall 17 of the casting A.

With the parts in normal position, as shown in Figure 1, it is evident that there will be no true wedging action from the wedge A to the shoes D until the wedge is engaged by the front follower. Consequently, as the compression stroke is initiated, the effective resistance is provided solely by the spring G, with the addition of such slight friction as may be present, due to the shoes engaging the friction surfaces of the shell, and stem C, and without any substantial or appreciable lateral pressure thereon. At this time, it will be noted that the actuating pressure is applied directly from the front follower 15 to the outer ends of the shoes D and as hereinbefore pointed out without any true wedging or spreading action. As the compression stroke continues, the friction shoes will be forced inwardly of the mechanism and be spread apart as they travel inwardly on the diverging exterior friction surface 23 of the post C. During this action, the wedge faces 120 of the shoes and the wedge faces 20 of the wedge A will be separated leaving the wedge substantially free until the forward end is engaged by front follower 15 and carried inwardly. This action continues until the wedge faces of the shoes, due to the diverging relation of the friction surface of the post, are brought into effective engagement with the faces 20 of the wedge. At this stage of the compression stroke it is evident that there will be an automatic change from the initial, substantially pure spring resistance (plus such slight frictional resistance as may occur between the shoes and shell) to an augmented frictional resistance induced by the action of the wedge C co-operating with the friction wedge shoe D. As the compression stroke continues from this point on, the shoes will be made to separate still further and the differential action will cause the outer ends of the friction shoes to be withdrawn from contact with the follower 15. When the mechanism has been fully compressed, the front follower will be in engagement with the outer wall 16 of the casting A and the abutments 29 will engage the outer ends of the stop members F and the actuating force will be transmitted directly through said members to the rear follower casting B and corresponding stop lugs, as hereinafter pointed out. The parts are so proportioned that the inner ends of the friction wedge shoes D will engage the shoulders 24 on the post C, at the same time that the front follower engages the outer end of the post C and movement of the wedge member A is limited by the stop members F, all of these elements together forming a solid column to transmit the load.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a longitudinally disposed friction post having exterior friction surfaces, diverging inwardly of the mechanism; of a spring resistance; a plurality of friction shoes cooperating with said friction surfaces; and pressure transmitting wedge means, the latter being free from effective wedge engagement with said shoes under full release but adapted to have cooperative wedge action with said shoes as the compression stroke of the mechanism takes place.

2. In a friction shock absorbing mechanism, the combination with a longitudinally disposed friction member having exterior friction surfaces, diverging inwardly of the mechanism; of a spring resistance; a plurality of friction shoes cooperable with said friction surfaces; pressure transmitting means cooperable with said shoes at the initial part of the compression stroke; and wedge means normally free from cooperative wedge action with said shoes, but adapted to have cooperative wedge action with said shoes as the compression stroke takes place.

3. In a friction shock absorbing mechanism, the combination with a member having longitudinally extending friction surfaces diverged in a direction lengthwise of said member; of a spring resistance; a plurality of wedge friction shoes frictionally cooperable with said surfaces and adapted to be yieldingly resisted by said spring; means for transferring the actuating pressure directly to said shoes in a direction lengthwise of the mechanism at the beginning of the compression stroke; and wedge means cooperable with said shoes after a predetermined amount of the compression stroke of the mechanism, the diverged formation of said friction surfaces of said member automatically inducing a change from direct application of the actuating pressure to said shoes to an application of the actuating pressure through said wedge means during the compression stroke.

4. In a friction shock absorbing mechanism, the combination with a friction post having a plurality of longitudinally disposed friction surfaces diverging inwardly of the mechanism; of a spring resistance; a plurality of friction shoes cooperable with said friction surface; wedge means initially engaging said shoes and free from actuating pressure during a predetermined initial portion of the compression stroke and adapted by the divergence of the surfaces of the friction post to directly receive the actuating pressure during the remainder of the stroke to effect a true wedging action on said shoes.

5. In a friction shock absorbing mechanism, the combination with a longitudinally disposed friction member having a plurality of exterior friction surfaces diverging inwardly of the mechanism; a spring resistance; wedge friction shoes coacting with said friction surfaces; means for transmitting the actuating pressure directly to said shoes at the beginning of the compression stroke and moving the same inwardly on the diverging surfaces of the friction member, thereby effecting a differential action; a wedge coacting with said shoes; and means for normally holding said wedge spaced from said means for transmitting the actuating pressure, said wedge being engaged and actuated by the pressure transmitting means after a predetermined amount of compression in the mechanism, due to said differential action, effecting direct application of the actuating force through the wedge during the remainder of the compression stroke.

6. In a friction shock absorbing mechanism, the combination with a friction post having a plurality of longitudinally disposed, inwardly diverging friction surfaces; of a spring resistance; wedge friction shoes coacting with said friction surfaces; means for transmitting the actuating pressure direct to said shoes at the beginning of the compression stroke; a wedge member having interior, inwardly diverging wedge faces cooperating with the wedge shoes; and means for positively limiting the outward movement of the wedge with reference to the post to normally hold the wedge spaced from the pressure transmitting means, said wedge being brought into engagement with said last named means and actuated thereby due to the diverging arrangement of the friction surfaces of the post after a predetermined amount of compression of the mechanism.

7. In a friction shock absorbing mechanism, the combination with a main follower; of a friction member having a plurality of longitudinally disposed, exterior friction surfaces diverging inwardly of the mechanism; of a spring resistance; a plurality of friction shoes cooperable with the friction surfaces of said member and adapted to engage said follower; a wedge having a plurality of wedge faces diverging inwardly of the mechanism cooperating with the corresponding wedge faces of the shoes; and means for positively limiting the outward movement of said wedge with reference to the friction member to maintain the outer end of the wedge spaced a predetermined distance from said main follower when the mechanism is in full release, whereby said wedge is initially free from actuating pressure, but is adapted to be engaged by said follower after a predetermined amount of compression to effect cooperating wedge engagement of the faces of said wedge and shoes as the shoes travel inwardly of the diverging friction surfaces of said member.

8. In a friction shock absorbing mechanism, the combination with a main follower; of a friction post having a plurality of longitudinally disposed friction surfaces diverging inwardly of the mechanism; a spring resistance; a plurality of friction shoes normally engaged by said follower, each shoe having an outer cylindrical wedge face and an inner flat friction surface; a wedge having a plurality of cylindrical wedge faces cooperating with the wedge faces of the shoes; and means for positively limiting the outward movement of said wedge and maintaining the outer end thereof spaced inwardly from the outer ends of said shoes when the mechanism is in full release, said sets of wedge faces automatically becoming effectively engaged as the shoes and wedge travel inwardly of the mechanism, the outer ends of the friction shoes simultaneously being withdrawn from engagement with said main follower.

9. In a friction shock absorbing mechanism, the combination with front and rear followers; of a central friction post fixed with reference to one of said followers and movable with reference to the other follower and having the free end thereof normally spaced from said last named follower and adapted to be engaged thereby upon full compression of the mechanism, said post having a plurality of exterior friction surfaces; a plurality of friction shoes engaged by said last named follower, each of said shoes cooperating with one of said post friction surfaces; a spring resistance; wedge pressure transmitting means cooperable with said shoes, said shoes and wedge pressure transmitting means having a plurality of cooperating sets of wedge faces; and means on said post for limiting the inward movement of said shoes upon engagement of said post by the follower which is movable relatively thereto.

In witness that I claim the foregoing I have hereunto subscribed my name this 15th day of July, 1924.

JOHN F. O'CONNOR.